United States Patent [19]
Allen et al.

[11] Patent Number: 5,404,532
[45] Date of Patent: Apr. 4, 1995

[54] PERSISTENT/IMPERVIOUS EVENT FORWARDING DISCRIMINATOR

[75] Inventors: Wade C. Allen, Durham; James L. Panian, Wake Forest; Paul J. Reder, Durham, all of N.C.

[73] Assignee: International Business Machines Corporation, Armonk, N.Y.

[21] Appl. No.: 159,894

[22] Filed: Nov. 30, 1993

[51] Int. Cl.6 .................. G06F 11/00; G06F 11/30
[52] U.S. Cl. .................... 395/700; 364/DIG. 1; 364/221.7; 364/222.1; 364/261.3; 364/264; 364/280; 364/280.3; 364/281.9; 364/284; 364/284.3
[58] Field of Search .............. 364/200, 221.7, 261.3, 364/280.3, 221.7, 222.1, 263.3, 264, 280, 280.3, 281.9, 284, 284.3; 395/700

[56] References Cited

U.S. PATENT DOCUMENTS 5,155,842 10/1992 Rubin ................................. 395/575
5,237,684 8/1993 Record et al. ..................... 395/650

OTHER PUBLICATIONS

CCITT Recommendation X.734; "Information Technology-... Part 5: Event Report Management Function"; ISO/IEC JTC1/SC21 N6360, Aug. 1991, pp. 1-23.
CCITT Recommendation X.701; "Information Technology-... Systems Management Overview"; ISO/IEC JTC1/SC21 N6353, Aug. 1991, pp. 1-25.
CCITT Recommendation X.721; "Information Technology-... Part 2: Definition of Management Information"; ISO/IEC JTC1/SC21 N6363, Aug. 1991, pp. 1-74.

*Primary Examiner*—Kevin A. Kriess
*Assistant Examiner*—Jonathan Hall Backenstose
*Attorney, Agent, or Firm*—Gerald R. Woods; Homer L. Knearl

[57] ABSTRACT

A new event forwarding discriminator (EFD) EFD named the persistent/impervious event forwarding discriminator (PI EFD) is described herein. The PI EFD is monitored by the agent infrastructure in such a way that if the agent goes down, and thus the PI EFD goes down, the agent rebuilds or restores the PI EFD with all its attributes. The PI EFD immediately creates an event notification indicating a create PI EFD event has occurred. This event notification is of the type passed by the PI EFD to the manager. The manager then knows the poll its other EFDs at the agent and recreate them as necessary.

To foil rogue managers, the PI EFD can not be deleted by other managers. Also, the PI EFD has limited attributes that can be changed. A rogue manager can only add himself to the destination list; it can not otherwise change the attributes of the PI EFD.

9 Claims, 16 Drawing Sheets

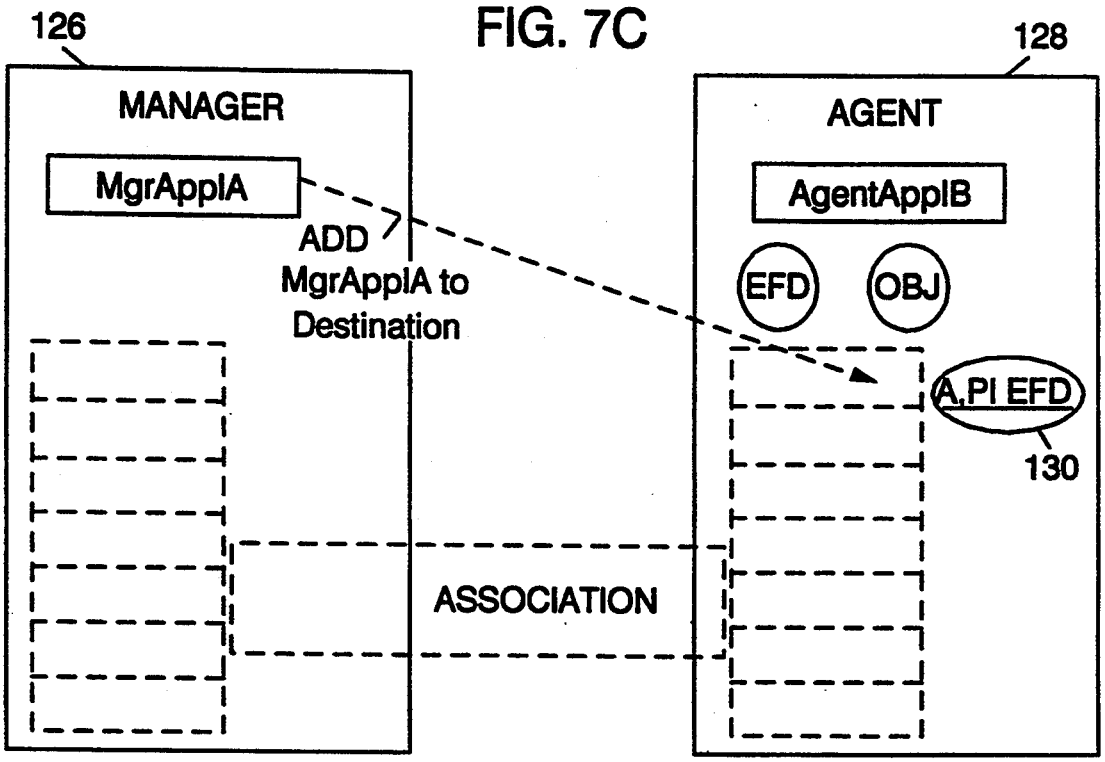
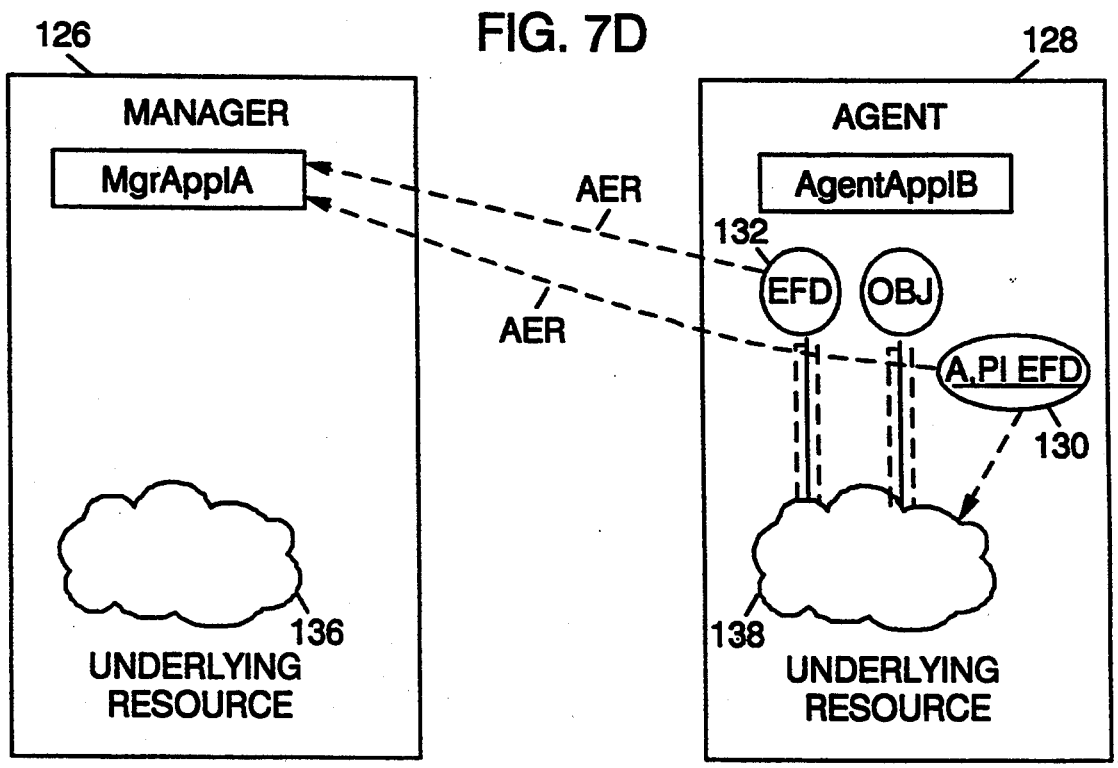

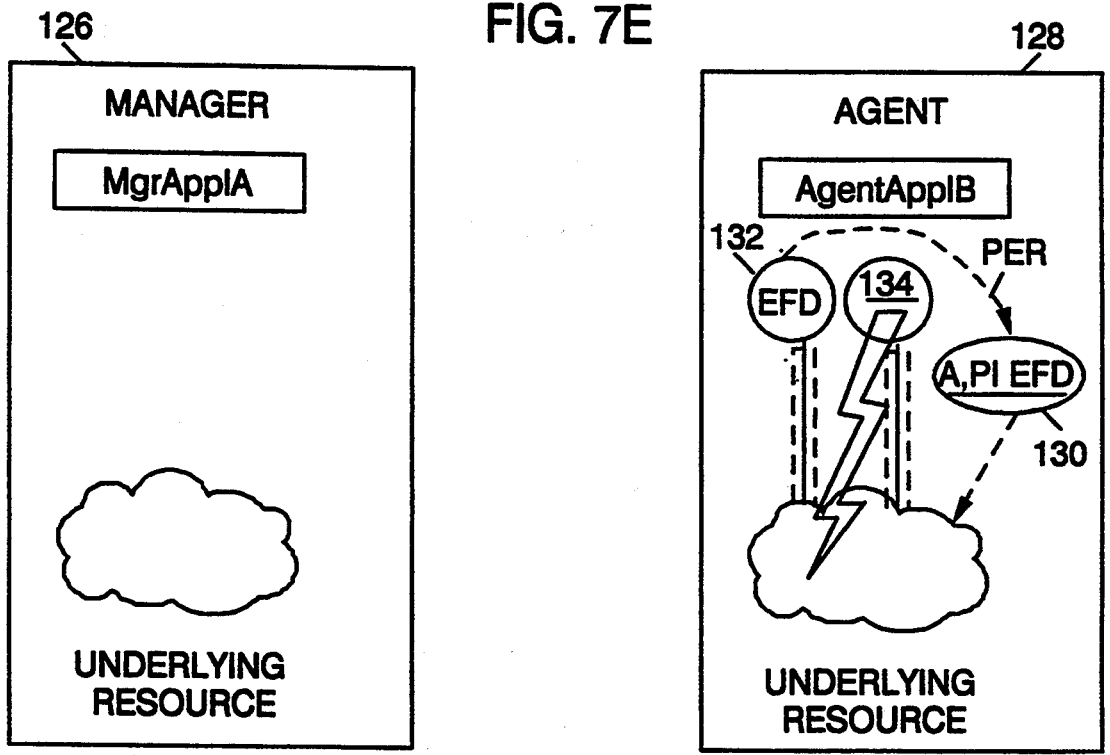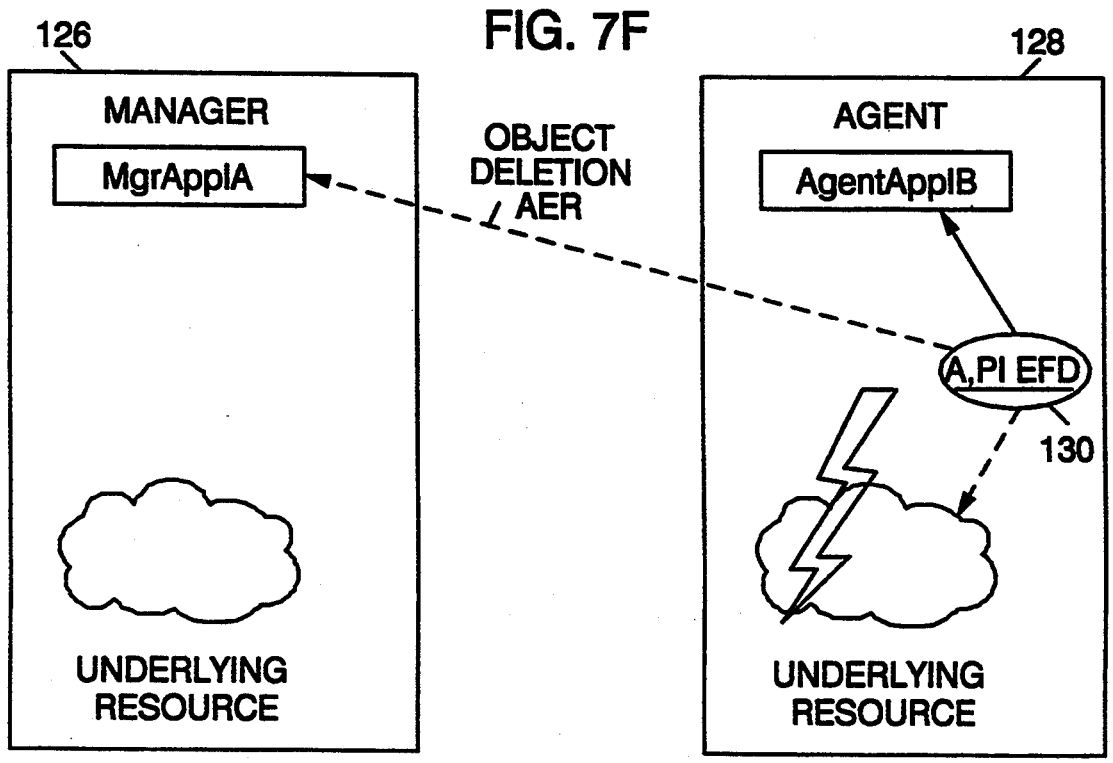

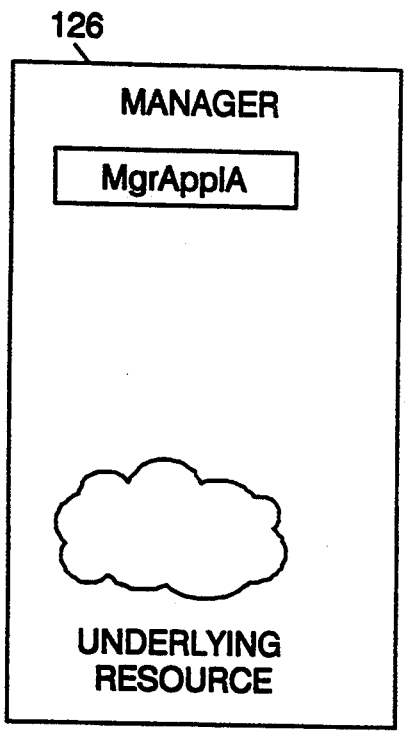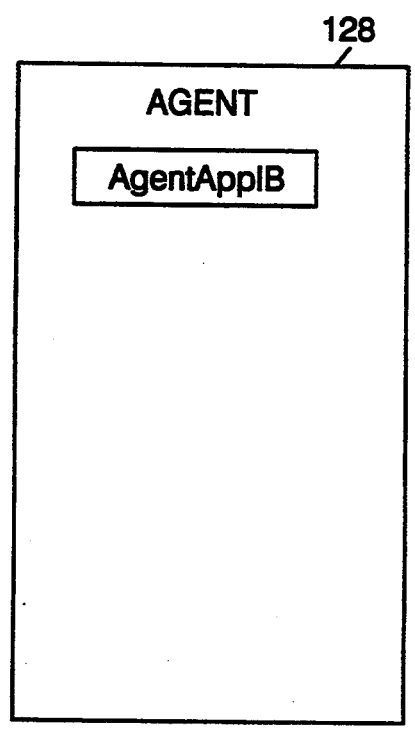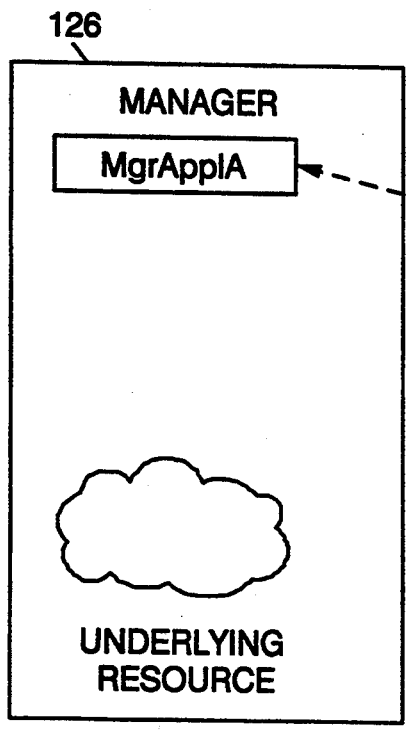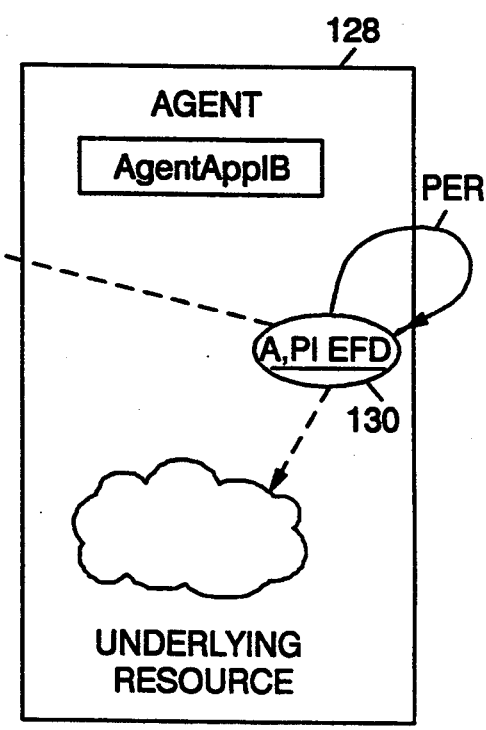
FIG. 7G
FIG. 7H

PERSISTENT/IMPERVIOUS EVENT FORWARDING DISCRIMINATOR

BACKGROUND OF THE INVENTION

1. Field of the Invention

This invention relates to a method and apparatus for providing an event forwarding discriminator (EFD) in a computer system. More particularly it relates to providing an EFD that is persistent in its recovery from catastrophic failure of the computing platform on which the EFD is running. Further, the invention provides an EFD that is impervious to invasions from a rogue managing program trying to breach the security of the EFD.

2. Description of Prior Art

Event forwarding discriminators (EFDs) are designed to a Open Systems Interconnection (OSI) standard. An open system is one that may be interconnected with another open system and each system will be compatible with the other. In open systems, EFDs are setup by an OSI managing program running on one computer platform. The manager program manages an agent program running on another computer platform in the same system or an open system connected to the system.

The manager programs and agent programs are application programs that run in association with each other. The manager sends operation request messages to the agent program, and the agent program exercises the resources on behalf of the manager program; the agent sends back event notification messages to the manager.

An EFD monitors event notifications from programs running in its computer system and forwards the notifications of interest to the manager as event reports. The manager program creates the EFDs at the agent program's computer to discriminate as to which notifications are passed back to the manager program. In this way EFDs reduce the communication workload between manager and agent. The manager only sees event reports for those events it has told the agent are significant. All other event reports are discriminated or filtered by an EFD and not passed back to the manager.

The EFD function is described in CCITT Recommendation X.734 entitled "Information Technology—Open Systems Interconnection—Systems Management—Part 5: Event Report Management Function" in ISO/IEC JTC1/SC21 N6360, Aug. 1991. The OSI Manager/Agent functions are described in CCITT Recommendation X.701 entitled "Information Technology—Open Systems Interconnection—Systems Management Overview" in ISO/IEC JTC1/SC21 N6353, Aug. 1991. Templates for the structure of management information are described in CCITT Recommendation X.721 entitled "Information Technology—Open Systems Interconnection—Structure of Management Information—Part 2: Definition of Management Information" in ISO/IEC JTC1/SC21 N-6363, Aug. 1991. Examples of implementation of the OSI Manager/Agent with EFD functions are the IBM Netview programs for the IBM System 390, RISC System 6000 and PS/2 with OS/2.

The advantage of the EFD function is that the manager application program no longer has to poll the managed object programs in the agent application program. Instead the manager sets up EFD program objects to monitor for potential event reports. Potential event reports are derived from notifications emitted by managed objects. When a notification is emitted by a managed object that a manager wishes to see, the EFD can notify the manager by transforming the resulting potential event report into an event report and forwarding it onto the manager.

Some problems exist with current OSI manager/agent structure and the EFDs. First, if the platform on which an EFD is running fails, the EFD can disappear with no notification to the manager. Since the EFD is incapable of forwarding event reports to the manager when the platform goes down, the manager assumes that no events have occurred and does not know the EFD has gone down. Second, EFDs are created, deleted and have attributes specified by a manager. A rogue or illegal manager might delete an EFD created by another manager, or a rogue manager might alter the EFD attributes, such as discrimination criteria or event notification destination list. The legitimate manager has no information about this rogue activity; it may simply just not hear from its EFD again.

TABLE OF ACRONYMS

ACSE—application communications service element
AER—actual event report
CMIP—common management information protocol
EFD—event forwarding discriminator
OSI—open systems interconnection
PER—potential event report
PI EFD—persistent impervious EFD

SUMMARY OF THE INVENTION

It is an object of this invention to provide an EFD that is persistent in the face of catastrophic failures in the system and impervious to security breaches by rogue OSI managers.

In accordance with this invention the above problems have been solved and the above and other objects have been accomplished by providing a new EFD named the persistent/impervious event forwarding discriminator (PI EFD). The PI EFD is monitored by the agent infrastructure in such a way that if the agent goes down, and thus the PI EFD goes down, the agent rebuilds or restores the PI EFD with all its attributes. The PI EFD immediately creates an event notification indicating a create PI EFD event has occurred. This event notification is of the type passed by the PI EFD to its manager. The manager then knows the poll its other EFDs at the agent and recreate them as necessary.

To foil rogue managers, the PI EFD can not be deleted by other managers. Further, the PI EFD cannot be locked out. Also, the PI EFD has limited attributes that can be changed. A rogue manager can only add himself to the destination list; it can not otherwise change the attributes of the PI EFD.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIGS. 7A–7J are pictorial illustrations of the manager and application using a PI EFD during normal operation, recovery from hard failure and soft failure.

DESCRIPTION OF THE PREFERRED EMBODIMENTS

Figure 1:
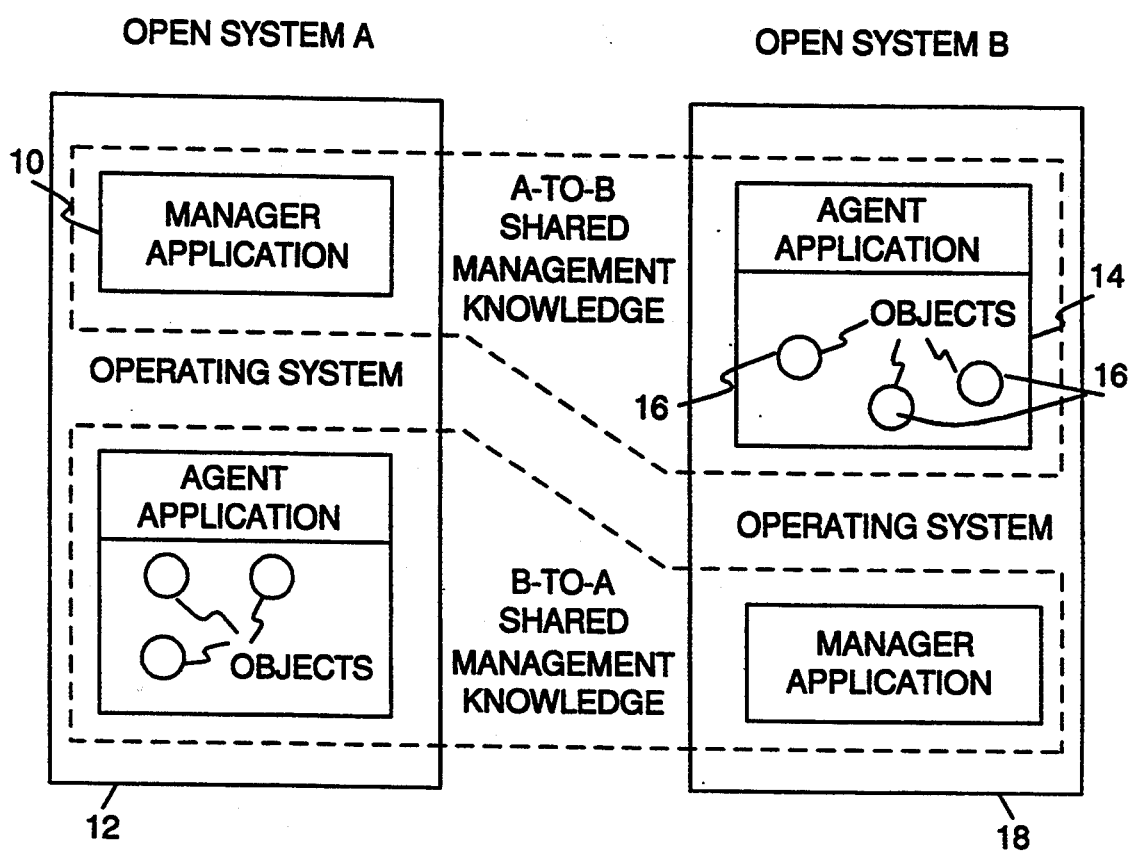
FIG. 1 shows manager and agent application programs running on operating systems in separate open systems.
Figure 2:
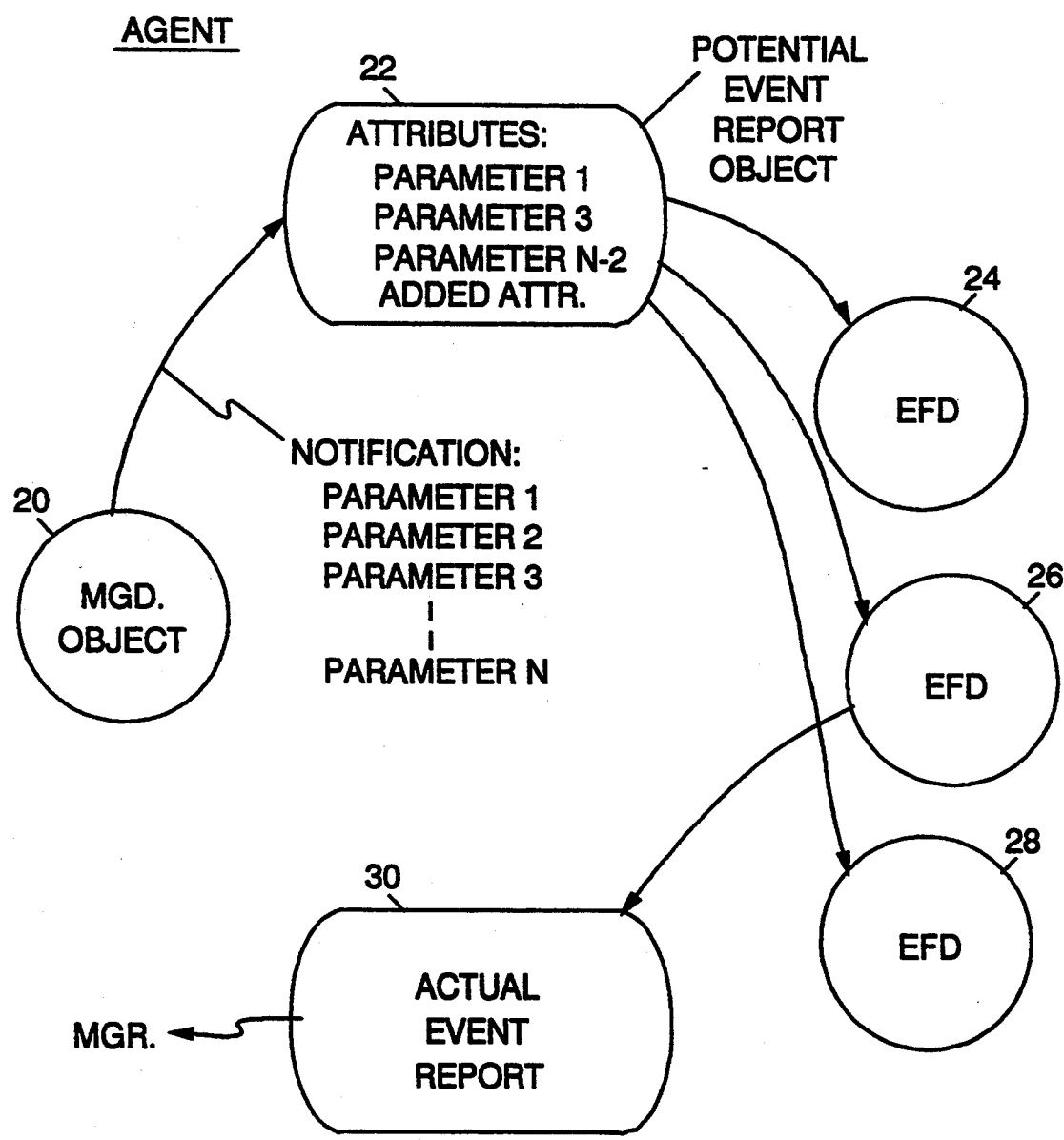
FIG. 2 illustrates the information flow in an agent application using event forwarding discriminators.
Figure 3:
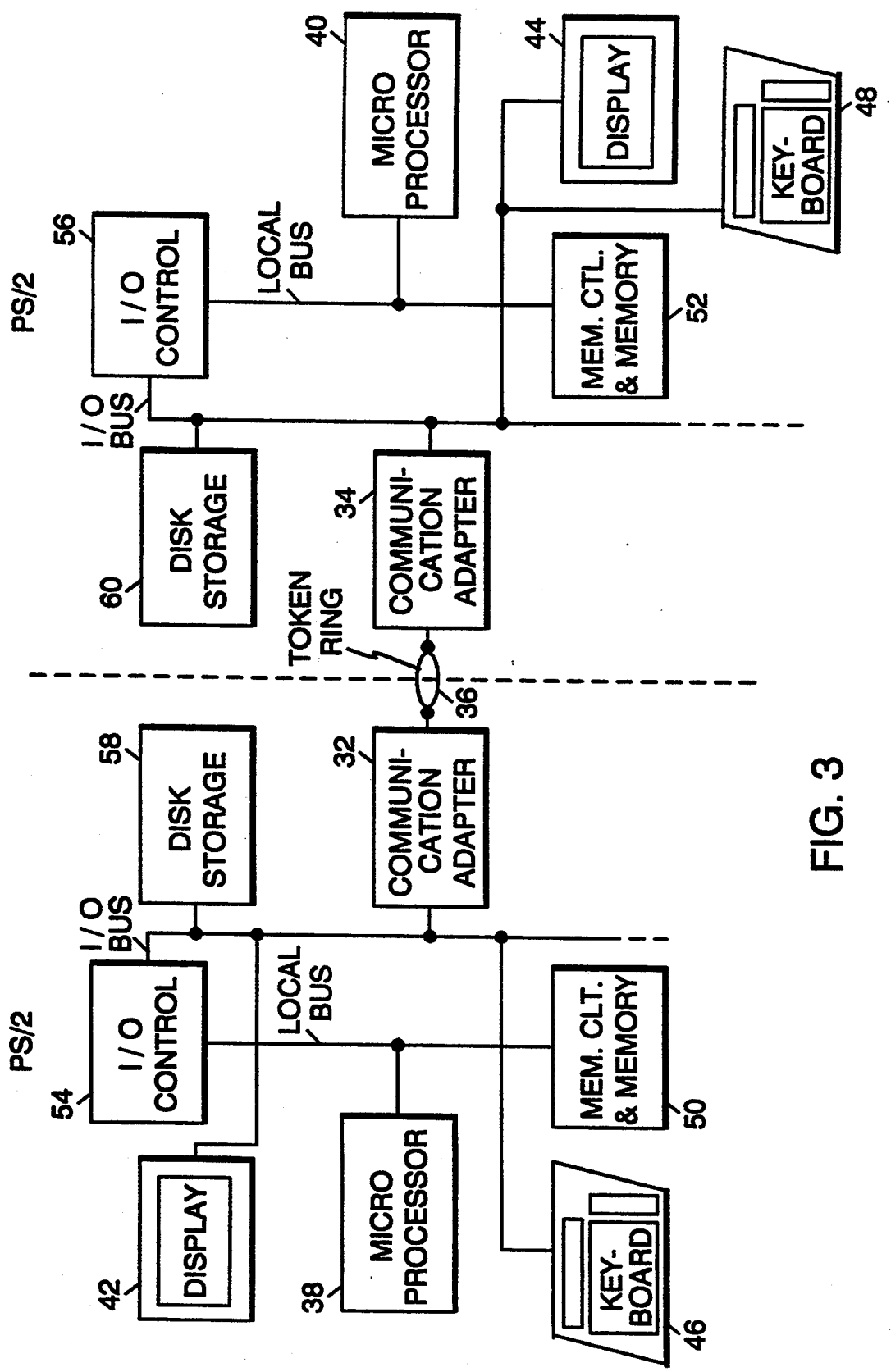
FIG. 3 is an example of computing systems in which the present invention can be embodied.

FIGS. 1–3 are exemplary of an operating environment for a preferred embodiment of the invention. In FIG. 1 the software hierarchy of manager and agent applications running on interconnected open systems A and B is illustrated. Manager application 10 is running on operating system 12 in open system A. Manager application 10 shares management knowledge to open system B and manages resources used by agent application 14. The resources managed by manager application 10 through agent 14 are managed program objects 16. The agent application 14 runs on operating system 18 in open system B.

Open system A and open system B are equally likely to contain manager applications. As depicted in FIG. 1, each open system has a manager application to manage resources for an agent application in the other open system. Also, a manager application and an agent application may reside in the same open system.

A managed object is supervised by its manager application through its agent application program by the manager issuing operation commands to manage the resources used by the object. A managed object may also issue asynchronous notifications. The notifications are built into event reports passed by the agent application to the manager application.

In FIG. 2, the flow of notifications and event reports at the agent application is illustrated. When an event occurs at a managed object 20, the object issues an notification with parameters 1 through N. Object 20 might be a program object and an event might be completion of a task, request for a resource, failure of a resource, etc. The notification is compiled into a potential event report (PER) 22 by the agent application program. The PER is forwarded to all event forwarding discriminators (EFDs) 24, 26 and 28. The EFDs discriminate as to whether the PER satisfies the criteria of discrimination for forwarding to one or more managers. EFD 26 concludes the criteria is met and forwards the PER as an actual event report (AER) 30 to the manager.

The manager and application programs in FIG. 1 run on an operating system in an appropriate open system. FIG. 3 is exemplary of hardware to implement the invention. The open systems are IBM Personal System/2 computers connected to each other through communication adapters 32 and 34 via a token ring local area network 36. The communication adapter is connected to the I/O bus in each PS/2 computer. Each PS/2 computer has a local bus and an I/O bus. The local bus interconnects the microprocessor 38, 40, memory and memory control 50, 52 and I/O bus through I/O control 54, 56. The I/O control through I/O bus provides access to I/O devices such as the display 42, 44, the keyboard 46, 48, disk storage 58, 60, the communication adapters 32, 34, printers (not shown), etc. The operating system running on this hardware is OS/2, and the communications software running on OS/2 is OS/2 Communications Manager. The manager and agent application programs run on top of OS/2 Communications Manager.

While the invention is implemented in this preferred embodiment on PS/2 computers running the OS/2 operating system, any number of other open computing platforms might be used such as the IBM RS/6000 running AIX operating system, the IBM AS/400 running OS/400 operating system or IBM System 390 running MVS or other operating systems.

Figure 4:
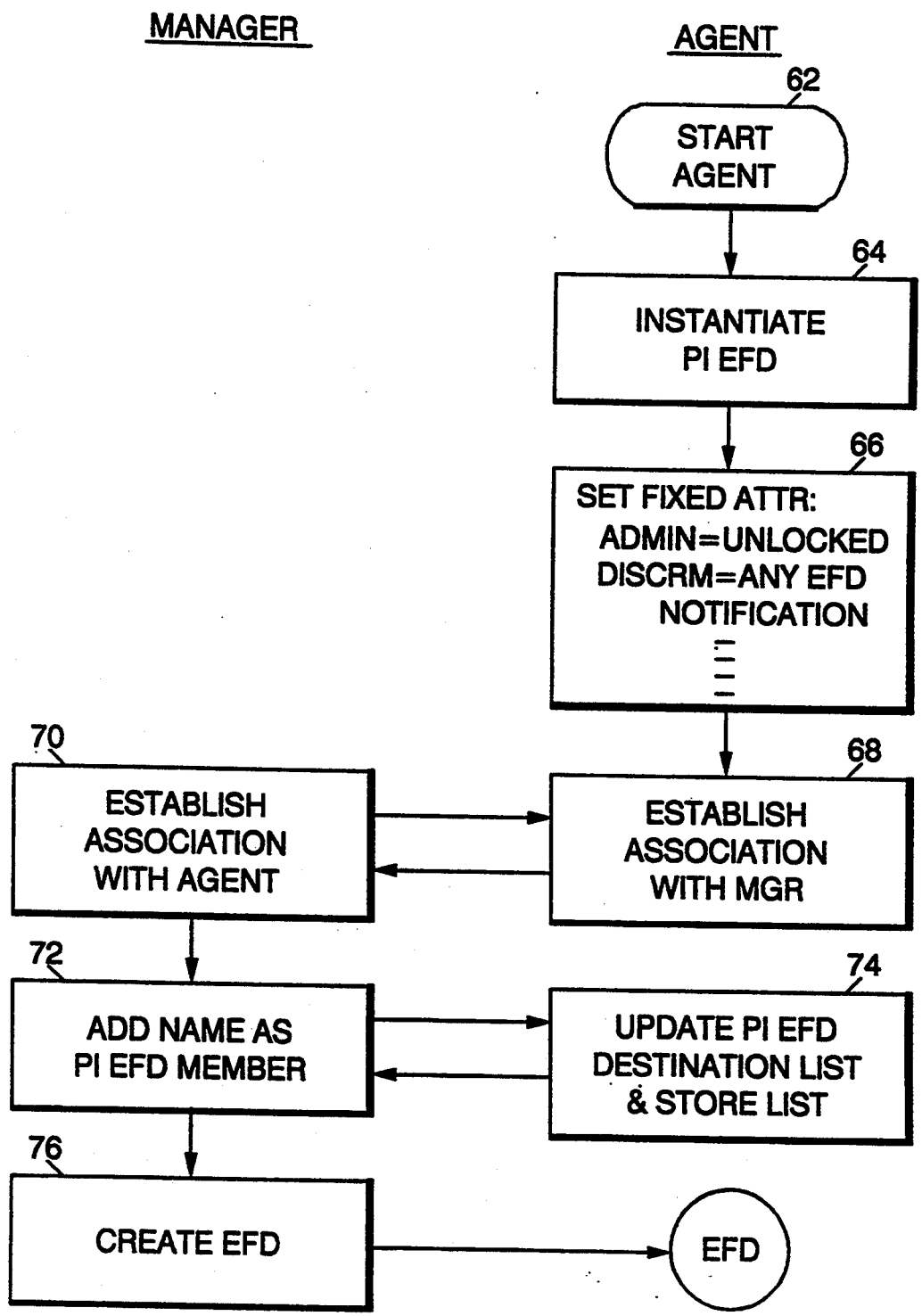
FIG. 4 illustrates start up procedure for creating persistent/impervious event forward discriminator in accordance with a preferred embodiment of the invention.

In FIG. 4, the logical operations or process flow for a manager and agent application program in the preferred embodiment of the invention are shown as the systems come up and establish a working association. The agent application starts up at operation 62. During the start up, the agent instantiates (brings to life) a persistent impervious event forwarding discriminator (PI EFD) at operation 64. After the PI EFD is brought to life, the agent at step 66 in the process sets a number of fixed attributes.

The attributes that are fixed in a PI EFD include: managed object class, name binding, packages, discriminator ID, discriminator construct, administrative state, and operational state. The managed object class attribute for the PI EFD is set to the appropriate subclass of EFD, which will be referred to as the persistent impervious EFD class. The persistent impervious EFD class is a subclass of the EFD class since it is based upon the same specification templates as the EFD class, but has extended the capabilities beyond those of the EFD class. The managed object class attribute is present in every managed object and provides an identification of the managed object class of the object. Manager applications use the managed object class attribute value to perform CMIP operations on all instances of a given managed object class, versus all instances of all managed object classes. The name binding attribute value identifies the name binding template in use by the managed object. The name binding template specifies the behavior of an instance of the PI EFD. Manager applications use the value of the name binding attribute to discover the name of the PI EFD by requesting that only managed objects with the value of name binding="impervious discriminator-system" respond to a CMIP GET operation. The Get response includes the name of the responding PI EFD. The packages attribute is set to multiple destination package and persistence package because an instance of PI EFD implements the specifications contained in the multiple destination package and the persistent package template definitions. The discriminator ID attribute is set to IMPERVEFD. The discriminator ID attribute provides the distinguishing part of the name of PI EFD. Fixing the value of the discriminator ID=IMPERVEFD provides another mechanism for manager application to identify the PI EFD to perform CMIP operations.

These attributes are set in accordance with data in templates defined in Appendix A.

The discriminator construct attribute is set to managed object class equality persistent impervious EFD; i.e. the discrimination criteria is any potential event report (PER) from an EFD. The administrative state attribute is set to unlocked. Since the administrative state is set to a fixed unlocked state by the agent no manager can turn off the PI EFD by changing the administrative state to locked. The operational state attribute is set to enabled or disabled by the agent in accordance with whether a managed object resource is available or down. Accordingly, the PI EFD is set as a fixed attribute to enabled since it must always be available when the agent is up and running.

An optional attribute set by the agent is confirmed or non-confirmed. This is not a fixed attribute. It is used to control whether the managed object, in this case a PI EFD, acknowledges receipt of an operation command from the manager. Other attributes in non PI EFDs are deliberately omitted to provide security for the PI EFD. These attributes include availability status, start time and stop time, mask for intervals of day and week, and scheduler name.

After the fixed attributes are set, the agent and manager at operations 68 and 70 communicate to establish a working association per the OSI management standards protocols in OSI Manager/Agent standard cited above. The establishment of the association is conventional. The manager would look up the name of the PI EFD of the agent and from that the network address of the agent. With communication established on the network, the manager and agent use the ACSE (Application Communications Service Element) protocol to negotiate the capabilities and establish a working association per the CMIP management protocols.

After the association is established between the manager and agent application programs, the manager at operation 72 issues an operation to the PI EFD in the agent to add the manager's name to the destination list attribute in the PI EFD. The destination list at the PI EFD controls which managers receive actual event reports (AERs) from the PI EFD. The agent at operation 74 in response to the operation message from the manager adds the manager's name to its destination list and stores the updated list in non-volatile storage in case the platform on which the PI EFD is running goes down.

As a last step in starting the working relationship between manager and agent, the manager in operation 76 creates one or more EFDs to filter AERs from its managed objects in the agent. These EFDs are conventional and not PI EFDs.

Figure 5:
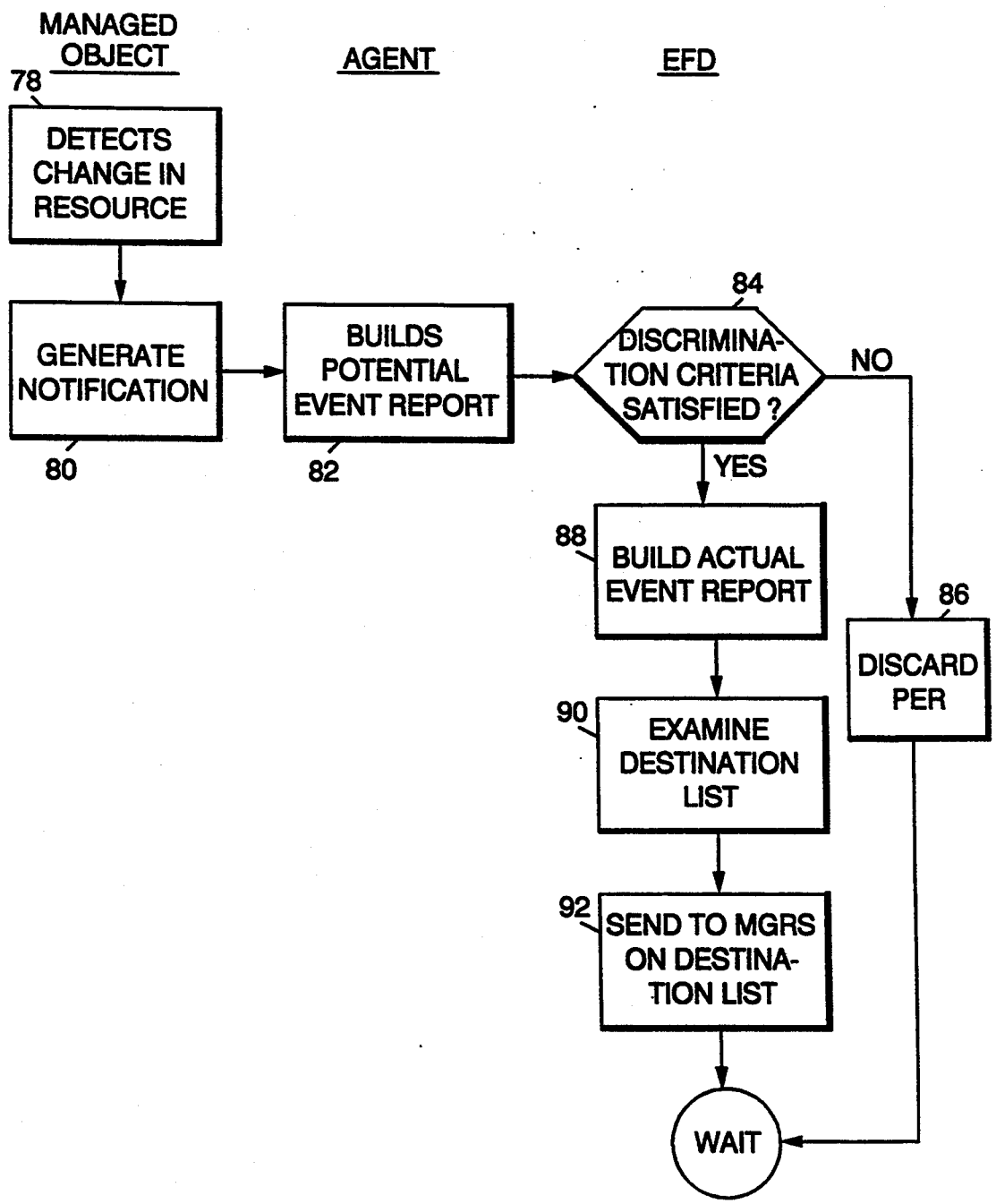
FIG. 5 shows the logical operations of an agent to accomplish the information flow illustrated in FIG. 2.

In FIG. 5 the logical operations performed at the agent application during normal operation of a managed object are shown. These operations would accomplish the flow of information depicted in FIG. 2. The managed object inside the agent application detects at step 78 a change in a resource used by the managed object. In operation 80, the managed object generates a notification. The agent application in operation 82 builds the PER (potential event report) from the parameters in the notification from the managed object. The PER goes to each EFD and the EFD in operation 84 tests whether parameters in the PER satisfy the discrimination criteria. If the EFD's criteria are not satisfied, the process branches to operation 86 which discards the PER. If the EFD's discriminator construct is satisfied by parameters in the PER, the process branches to operation 88. In operation 88 the EFD builds the AER (actual event report) from the PER. After the AER is compiled as a copy of all or portions of the PER, the EFD in step 90 examines its destination list for managers who are to receive the AER. A copy of the AER is sent by operation 92 to all managers on the EFD's destination list. The EFD then waits for its next operation which may be to test its discrimination criteria against another PER. This completes the normal operation of a conventional EFD at an agent application.

Figure 6A:
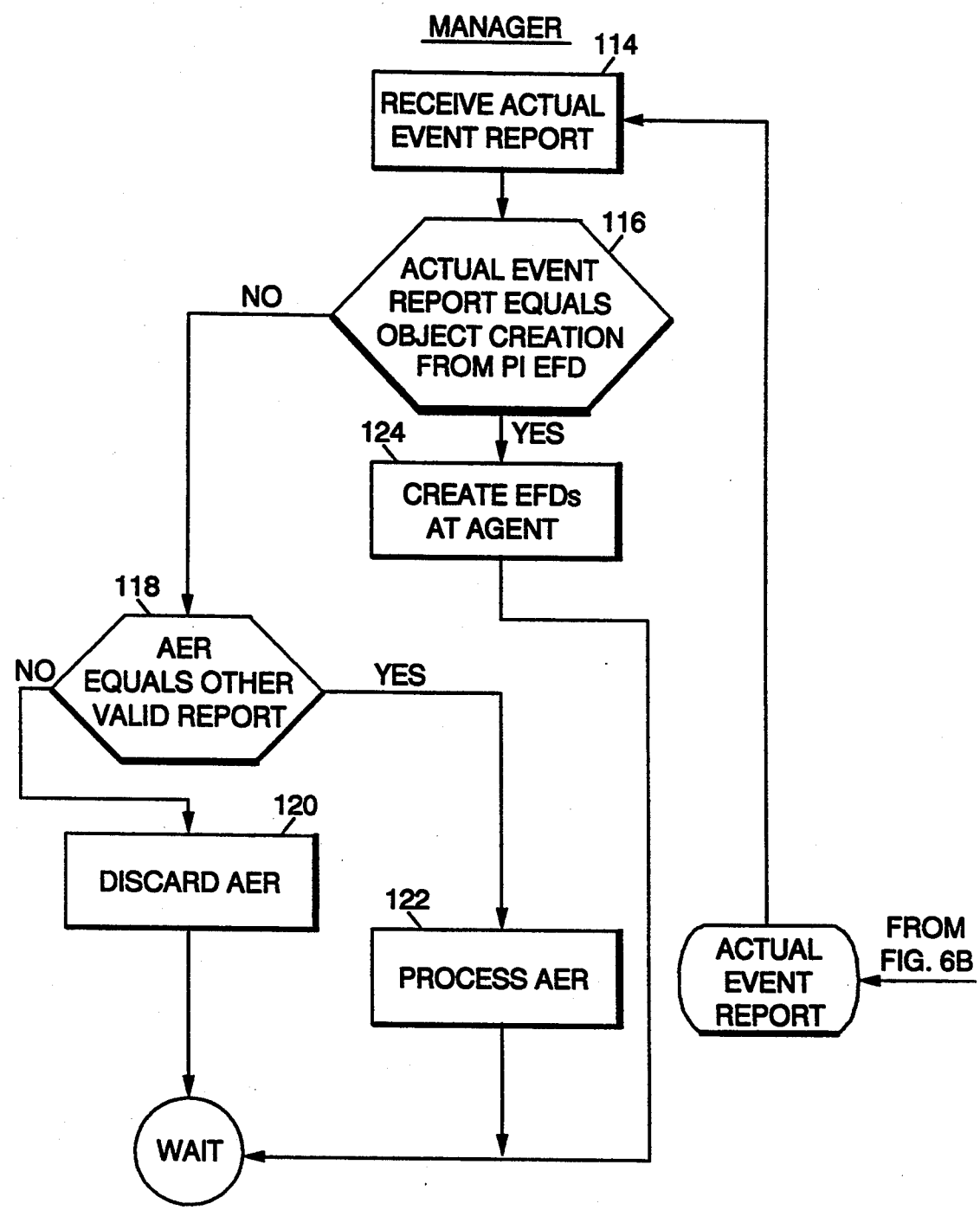
FIGS. 6A and 6B show the interactive processes between a manager and agent to recover from hard failure at the agent.
Figure 6B:
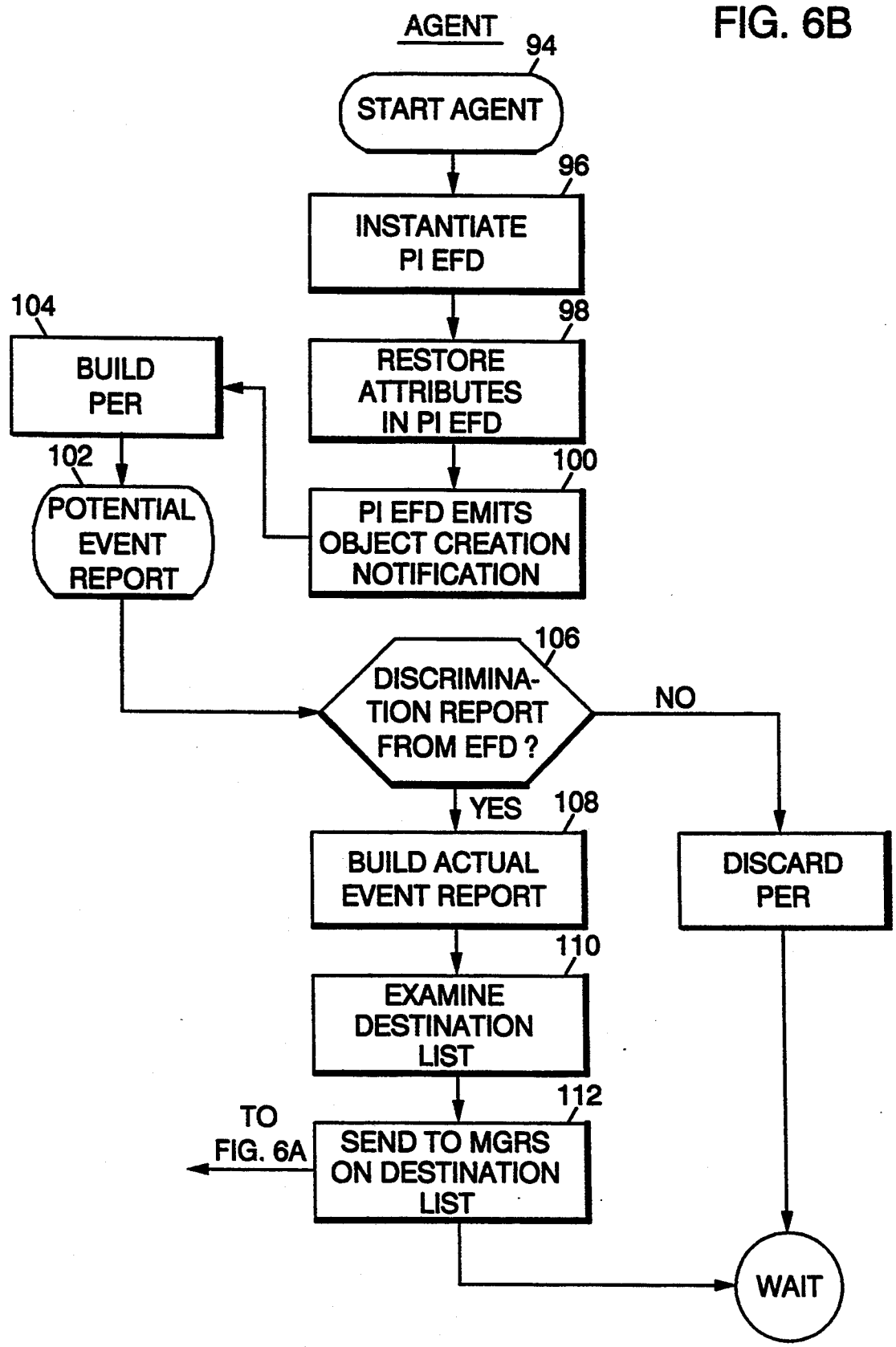

In accordance with a preferred embodiment of the invention, a manager application in FIG. 6A works with an agent application in FIG. 6B having a persistent impervious EFD to recover from a failure at the agent application which has caused the agent application and thereby its PI EFD to go down, i.e. be inoperative. It is assumed in the scenario of FIGS. 6A and 6B that the agent went down so fast that no EFD got off an AER indicating any managed objects, including the EFDs, had failed.

In FIG. 6B when the platform on which the agent is running comes back up, the agent application reloads and restarts at operation 94. Just as in FIG. 4, the agent instantiates the PI EFD at operation 96. In operation 98, the agent restores all the attributes of the PI EFD to their state when the PI EFD went down. This is accomplished by retrieving the attributes from non-volatile storage. When a PI EFD is up and running any updated attributes must be stored in non-volatile storage at the time of updating. Then the PI EFD can be recovered as of its last state of operation when it crashed. It is this characteristic that is referred to as persistent for the PI EFD.

When the PI EFD is restored, it emits an object creation notification at step 100. The agent builds a potential event report (PER) 102 at step 104 from this notification. The discriminator construct at the PI EFD is set, as discussed above, to accept a PER from any EFD. Accordingly, test operation 106 is satisfied and the process branches to operation 108. Operation 108 builds the AER indicating PI EFD object creation. The PI EFD then retrieves the destination list at step 110, and operation 112 sends the AER to all managers on the destination list. The logical process then waits for the next operation or PER.

In FIG. 6A, the manager receives the AER at operation 114. Decision operation 116 then tests whether the AER indicates a PI EFD object creation. If it does not, the manager detects at step 118 whether the AER is some other valid report. If it is not, the process branches to operation 120 to discard the AER; otherwise the process branches to operation 122 to process the AER.

In the present example, the AER from the agent in FIG. 6B is an AER indicating PI EFD object creation. The process branches from decision operation 116 to operation 124. The manager at operation 124 creates the other EFDs that it uses at the agent. In effect the manager learns from the AER that the PI EFD just came back up. The manager then assumes that all EFDs must have gone done, therefore in operation 124 recreates the EFDs. The manager then enters a wait state waiting for the next AER or other operations.

Figure 7A:
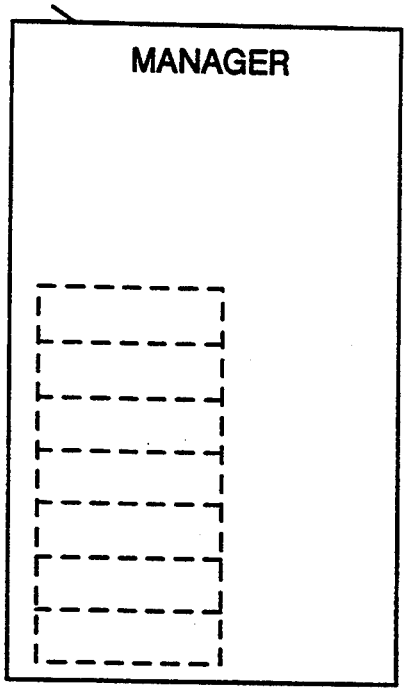
Figure 7A:
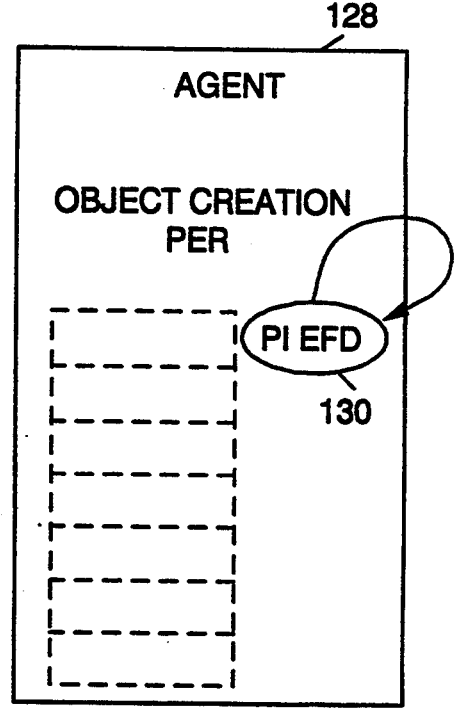

FIGS. 7A through 7J are pictorial drawings indicating events and the flow of information resulting from the events. In particular FIGS. 7A through 7D illustrate the information flow for start up and normal operations as described above in FIGS. 4 and 5. In FIG. 7A, the manager 126 and agent 128 are just coming up. Each has operations or tasks 130 and 132, but as yet there is no working association between the manager and agent. At the agent 128, the PI EFD 130 program object is created and generates an object creation PER. Since there is no manager on the destination list of the PI EFD, no AER is sent.

Figure 7B:
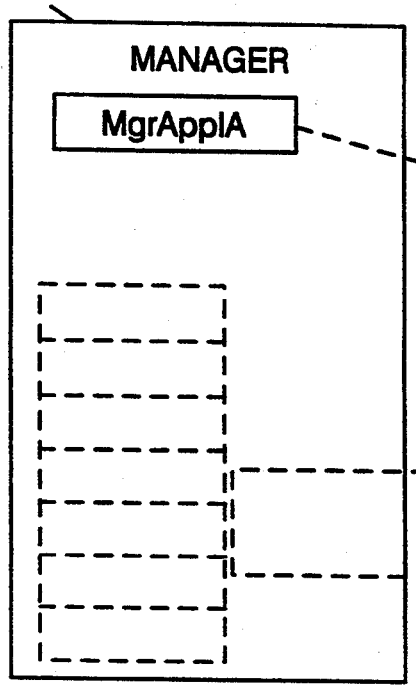
Figure 7B:
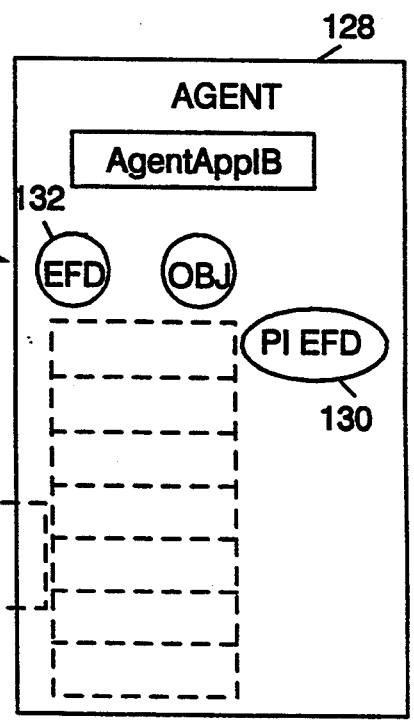
Figure 7I:
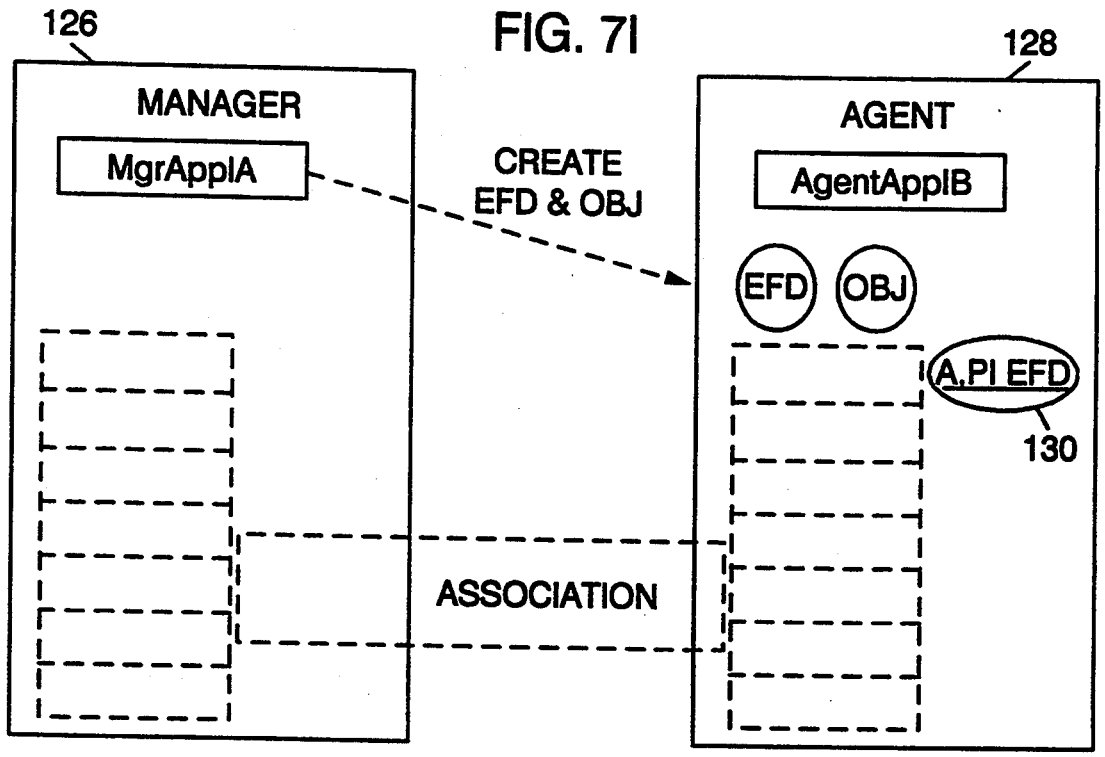

In the next stage of events shown in FIG. 7B, the association 131 between the manager 126 and agent 128 is established as described above for FIG. 4. The manager with operation messages then creates EFD 132 and managed object 134 in the agent to filter the event reports that are to be sent from the agent to the manager. Lastly in FIG. 7C, manager 126 adds its name "A" to the destination list of the PI EFD 130.

In FIG. 7D, the manager and application are depicted in normal operation running on underlying resources 136 and 138, respectively. The association between manager and agent remains but is not shown in FIGS. 7D–7H. As managed objects (only EFDs are shown) in the agent detect changes in resource in FIG. 7D, the AERs are sent from EFD 132 to the manager. Manager 126 has previously created EFD 132 with the manager's name "A" on the destination list of EFD 132. PI EFD 130 also sends an AER to a manager A when EFD 132 or PI EFD 130 emits a notification.

In FIG. 7E the underlying resource that is used by PI EFD 130 and EFD 132 and managed object 134, goes down for example due to a power failure. EFD 132 and object 134 as program objects are deleted as their underlying resource goes down. It is assumed in FIG. 7E, that EFD 132 as it goes down is able to emit an object deletion notification which is passed as a PER to PI EFD 130. Next, PI EFD 130 sends an object deletion AER to manager application A as shown in FIG. 7F. Manager A may then take recovery steps as described hereinafter with reference to FIG. 8B. FIGS. 7E and 7F depict what is called a soft failure in that the EFD's go down slowly enough that they get object deletion reports sent before they crash.

A hard failure at the agent is depicted in FIG. 7G. In this failure case all the EFDs including the PI EFD simply disappear. The failure of the underlying resource is so quick, that no AER is sent the manager. Accordingly manager application A in manager 126 operates as if all of its managed objects in agent application B in agent 128 were still running.

Figure 7J:
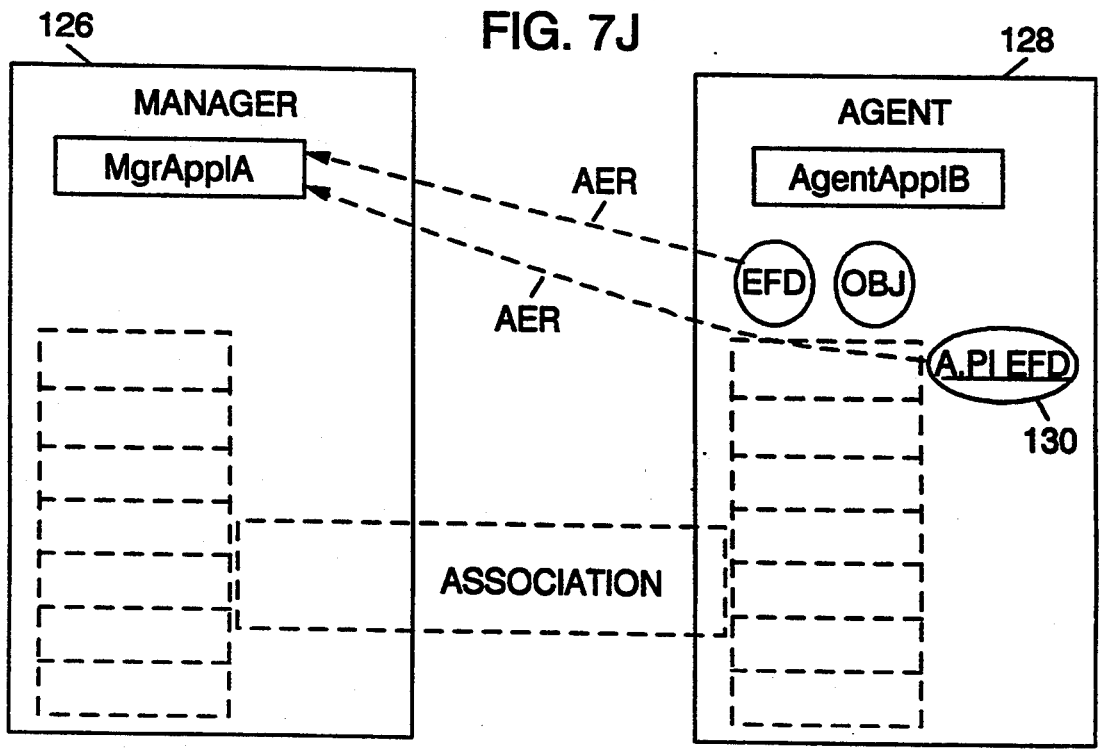

In FIG. 7H the underlying resource in agent 128 comes back up. Agent application B then comes up and brings to life PI EFD 130. PI EFD 130 emits an object creation PER and detects this PER. In response to the PER, PI EFD 130 then sends an object creation AER to manager A. As discussed for FIGS. 6A and 6B, manager A then knows that the PI EFD went down and came back up and that it is likely all of A's managed objects including its EFDs have been deleted. Manager A then in FIG. 7I then begins to recreate the managed objects and EFD 132 in agent 130. In FIG. 7J, the objects, EFDs, and PI EFD have resumed normal operations forwarding AERs to manager A as events occur at the agent.

Figure 8A:
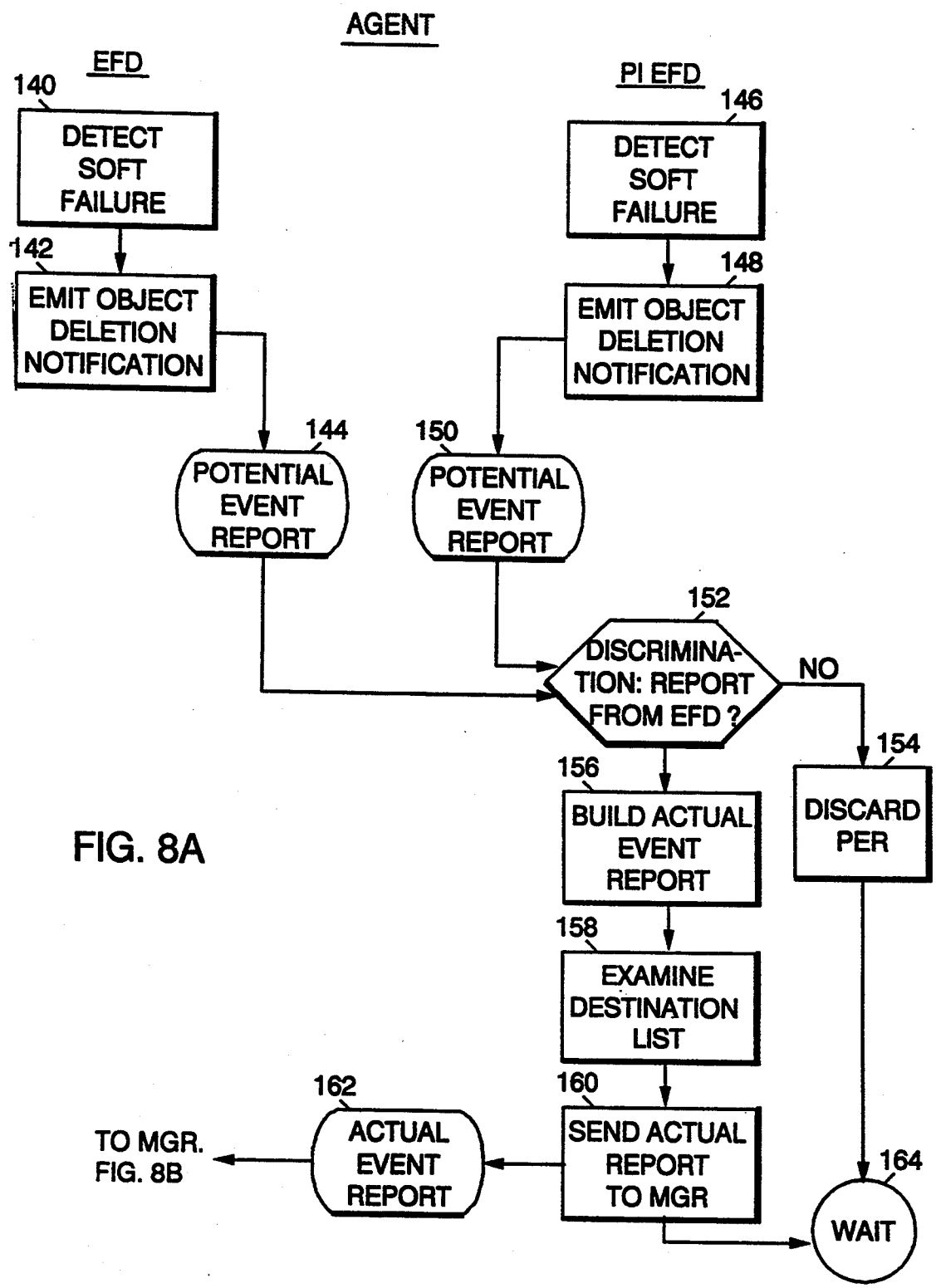
FIGS. 8A and 8B show the interactive processes between a manager and agent to recover from soft failure at the agent.

The logical operations performed at the agent during a soft failure and the recovery operations performed by the manager will now be described with reference to FIGS. 8A and 8B. The agent is shown in FIG. 8A. There are two possibilities for object deletion notification. Operation 140 in an EFD detects failure of its resources, and the EFD emits an object deletion notification at step 142. The agent converts the object deletion notification into a PER 144. Similarly, the PI EFD could perform the same process steps if it detected its resources were deteriorating. Operation 146 detects the failure, and operation 148 generates the object deletion notification which is built into a PER 150 by the agent.

The discrimination logical operation 152 in the PI EFD would detect whether either PER 144 or PER 150 is from an EFD. If the detected PER is not from an EFD it is discarded by operation 154. If the PER is from an EFD, including PI EFD, the process branches to operation 156. Operation 156 builds the AER for the object deletion. The PI EFD in steps 158 and 160 detects which manager is to receive the AER and sends the AER 162 to the manager. The process at the agent then enters the wait state 164.

Figure 8B:
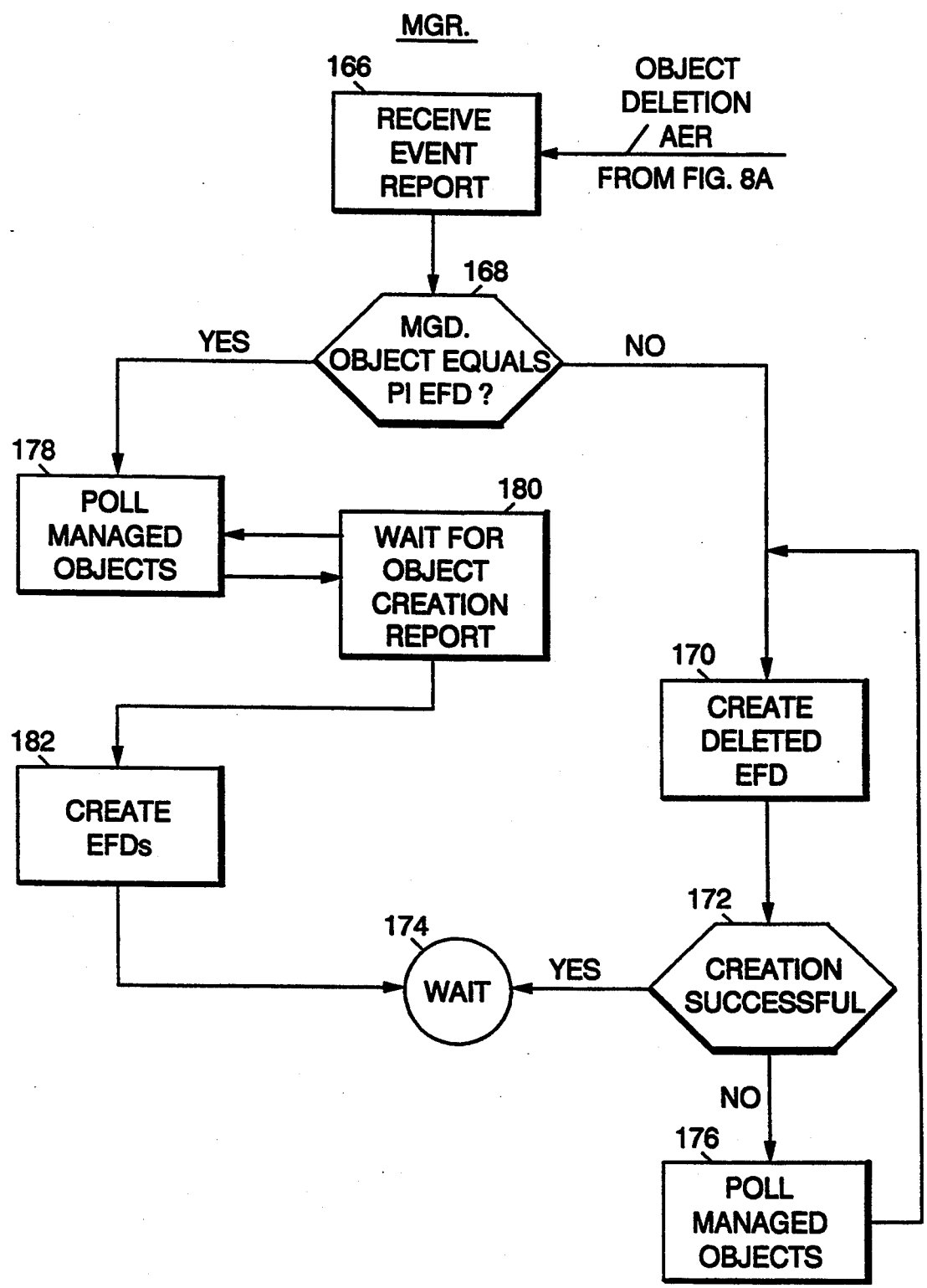

In FIG. 8B, the manager receives the object deletion AER in operation 166. Decision operation 168 detects whether the object deletion AER is from a PI EFD. If the object deletion is not from the PI EFD, the manager knows the PI EFD is still up. Therefore, the manager at operation 170 creates the deleted EFDs other than the PI EFD. Decision operation 172 looks for confirmation that the creation was successful. If the creation is successful, process goes to the wait state 174. If the creation is not successful, the manager can not rely on the EFDs for information about managed objects and therefore begins to poll the managed objects directly at step 176. The process loops back to step 170 where the manager again tries to create the deleted EFD.

If the decision operation 168 detects that the AER was from an PI EFD, the recovery process at the manager branches to operation 178. Since the AER indicated the PI EFD was going down, i.e. object deleted, the manager assumes all EFDs are deleted and reverts to polling the managed objects in operation 178. The process continues to poll the managed objects until operation 180 detects receipt of an object creation AER from the PI EFD as described above for FIG. 6A. The manager then creates EFDs at the agent in operation 182, the process goes to the wait state 174, and normal operations of the manager and agent resume.

Figure 9A:
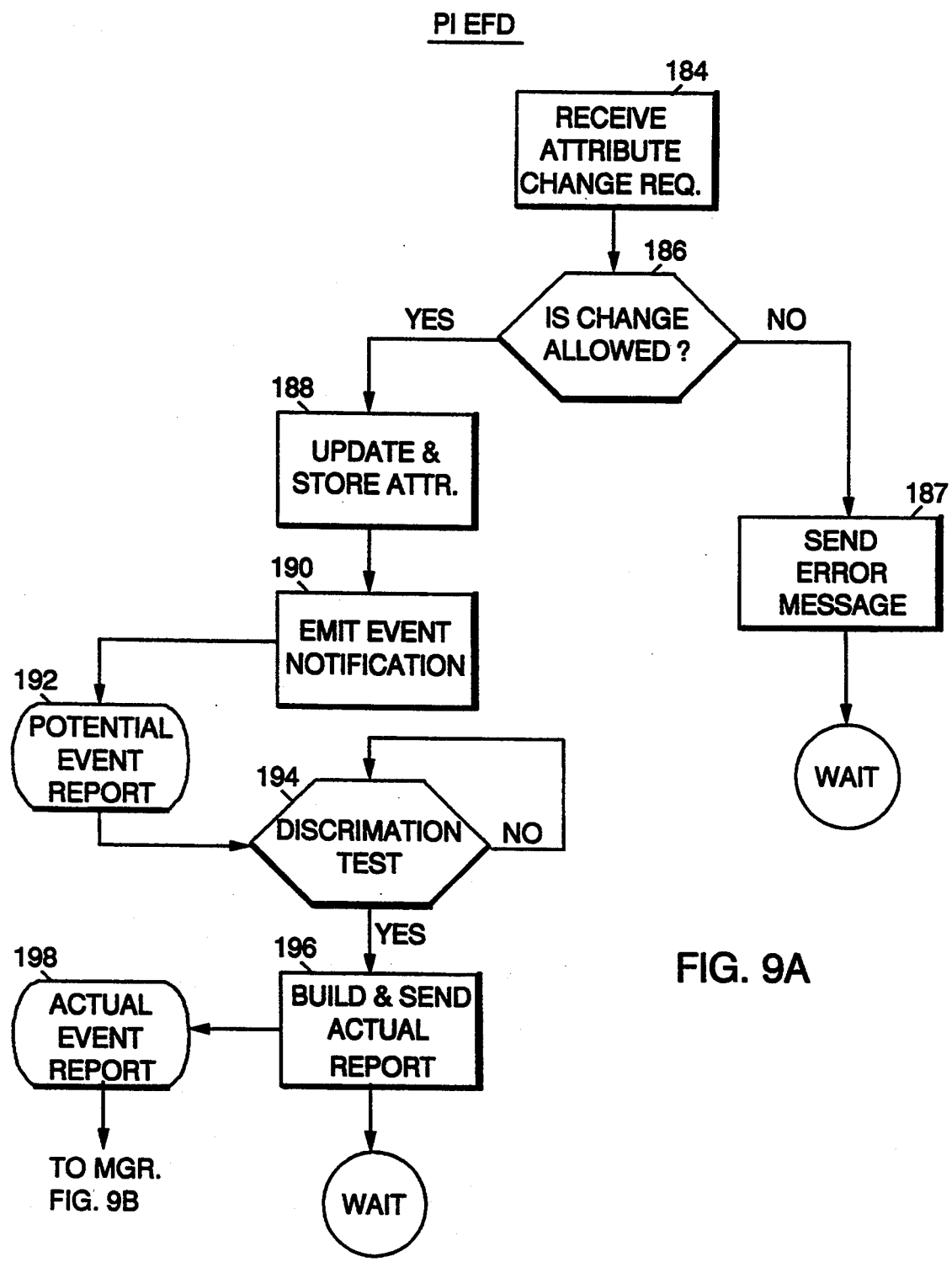
FIGS. 9A and 9B show the interactive processes between a manager and agent to prevent illegal attribute changes.
Figure 9B:
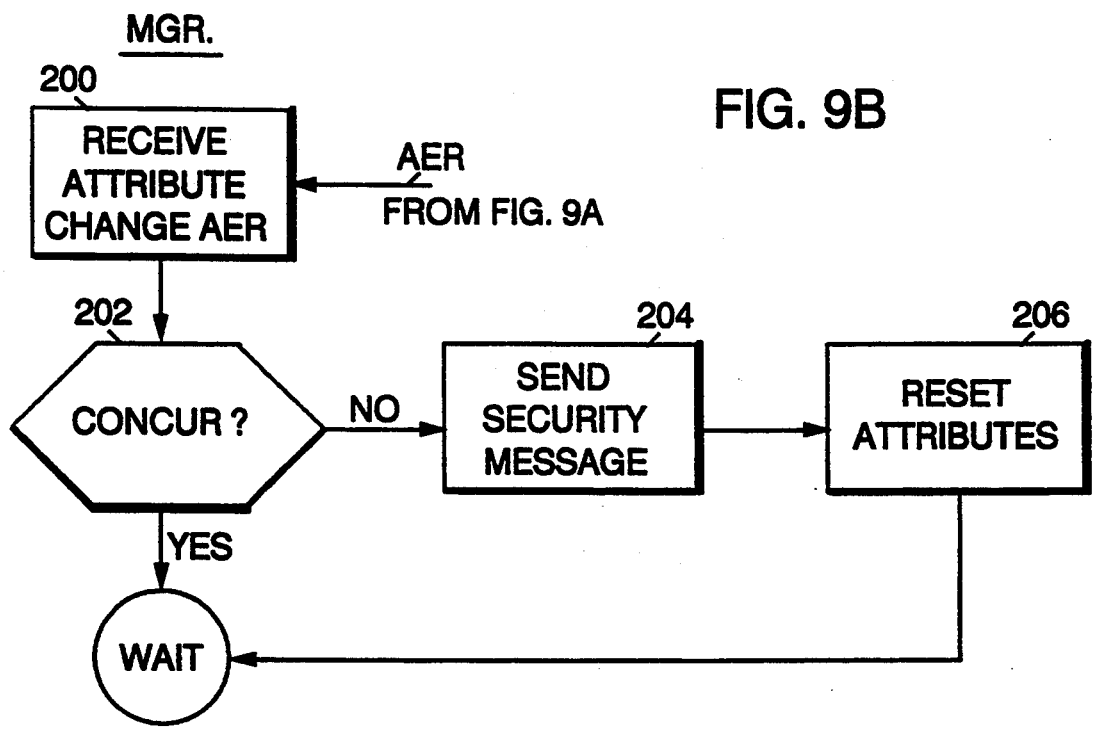
Figure 10:
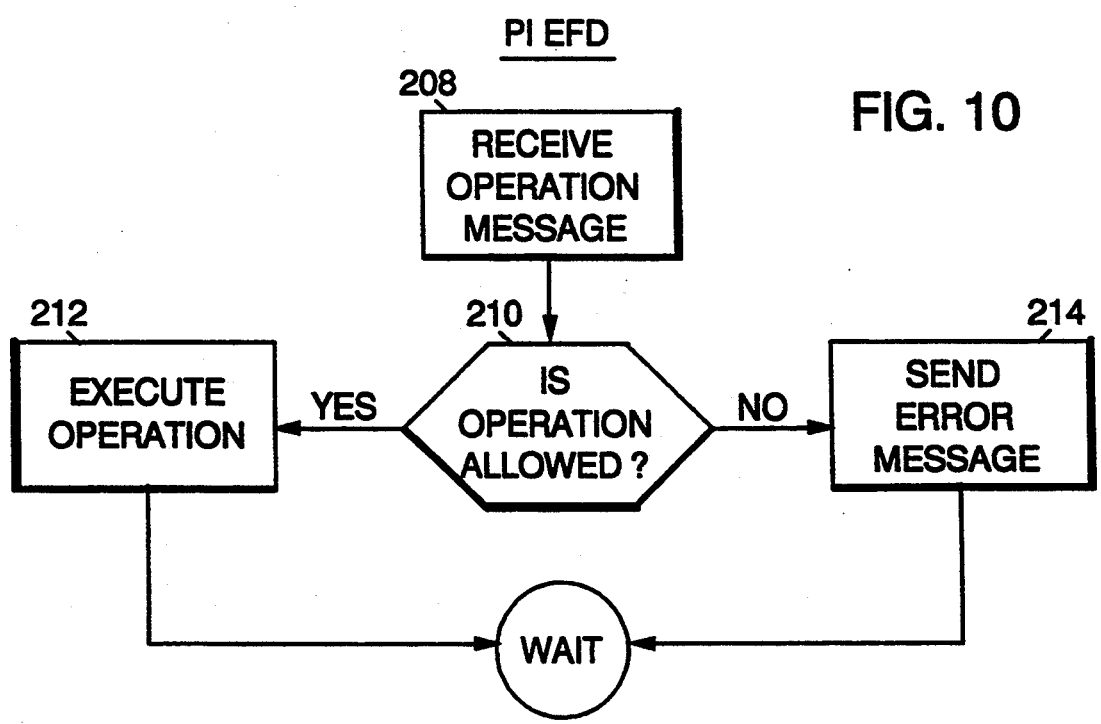
FIG. 10 shows the logical operations at a PI EFD to prevent execution of illegal operation requests.

The above description largely relates to the persistent operative characteristic of the PI EFD. In FIGS. 9A, 9B and 10, the impervious operative characteristic of the PI EFD is described. Impervious refers to the PI EFD being resistent to security breaches. In FIG. 9A, the operation of the PI EFD is described when it receives an attribute change request in an operation message from a manager. The request is received at step 184, and decision operation 186 tests whether the change is allowed. If the change is not allowed, the PI EFD at step 187 sends an error message to the manager trying to change the attribute. In the case of PI EFD, most attributes can not be changed, thus making the PI EFD resistent to illegal actions by rogue managers.

One change that is allowed is a change to the destination list for AERs. If the change is allowed, the process branches to operation 188 where the attribute is updated and the update is stored. The PI EFD then emits an event notification at step 190, and the agent converts the notification into a PER 192. The PI EFD discriminator 194 detects the PER as from an EFD and builds and sends at step 196 the attribute change AER 198 to the manager in FIG. 9B.

In FIG. 9B, the manager receives the attribute change AER in operation 200. Decision operation 202 then tests whether the manager concurs with the attribute change. If the manager concurs, the process goes to the wait state. If the manager does not concur, the manager in operation 204 sends a security breach message to the system log or a system operator. Thereafter, in operation 206 the manager resets the attributes back to the state they were in before the change.

Another impervious characteristic of the PI EFD is that it is resistent to object deletion operation messages. In FIG. 10, the PI EFD at step 208 receives an operation message from a manager. If the operation is allowed, such as a get operation, decision operation 210 branches the process to operation 212. Operation 212 executes the operation. If the operation is not allowed, such as a delete object operation, decision operation 210 branches the process to operation 214. Operation 214 sends a security breach message to the system log or a system operator and sends an error message to the manager who issued the delete object operation message. Accordingly, the existence of the PI EFD is preserved and can not be breached by manager applications.

While a number of preferred embodiments of the invention have been shown and described, it will be appreciated by one skilled in the art, that a number of further variations or modifications may be made without departing from the spirit and scope of our invention.

APPENDIX A

MANAGED OBJECT CLASSES allomorphismSensitiveEFD

```
allomorphismSensitiveEFD MANAGED OBJECT CLASS
    DERIVED FROM
        "CCITT Rec. X.721 (1992) | ISO/IEC 10165-2 :
        1992":eventForwardingDiscriminator;
    CHARACTERIZED BY
        allomorphismSensitiveEFDpkg;
    CONDITIONAL PACKAGES
        multipleDestpkg PRESENT IF "if an instance of this class supports multiple destinations with
            no back up capability", singleDestpkg PRESENT IF "if an instance of this class supports a single destination with
            back up capability", persistencepkg PRESENT IF "if an instance of this class supports persistence. ";

REGISTERED AS { iso(1) identified-organization(3) ibm(18) 0 0 2054 };
```

PACKAGES allomorphismSensitiveEFDpkg

```
allomorphismSensitiveEFDpkg PACKAGE
    BEHAVIOUR
        allomorphismSensitiveEFDBhv;
    ATTRIBUTES
        switchMOCTo
            REPLACE-WITH-DEFAULT
            DEFAULT VALUE ASEFDmodule.emptySet
            GET
            ADD-REMOVE;
    REGISTERED AS { iso(1) identified-organization(3) ibm(18) 0 0 2063 };
``` multipleDestpkg

```
multipleDestpkg PACKAGE
    BEHAVIOUR
        multipleDestBhv;
    ATTRIBUTES
```

```
            "CCITT Rec. X.721 (1992) | ISO/IEC 10165-2 : 1992":destination
                PERMITTED VALUES ASEFDmodule.MultipleDestination
                GET-REPLACE
                ADD-REMOVE;
        REGISTERED AS { iso(1) identified-organization(3) ibm(18) 0 0 3406 };
``` persistencepkg

```
        persistencepkg    PACKAGE
            BEHAVIOUR
                persistenceBhv,
        REGISTERED AS { iso(1) identified-organization(3) ibm(18) 0 0 3407 };
``` singleDestpkg

```
        singleDestpkg PACKAGE
            BEHAVIOUR
                singleDestBhv;
            ATTRIBUTES
                "CCITT Rec. X.721 (1992) | ISO/IEC 10165-2 : 1992":destination
                    PERMITTED VALUES ASEFDmodule.SingleDestination
                    GET-REPLACE,
                "CCITT Rec. X.721 (1992) | ISO/IEC 10165-2 :
                1992":activeDestination
                    GET,
                "CCITT Rec. X.721 (1992) | ISO/IEC 10165-2 :
                1992":backUpDestinationList
                    GET-REPLACE;
        REGISTERED AS { iso(1) identified-organization(3) ibm(18) 0 0 3408 };
```

PARAMETERS

NAME BINDINGS imperviousDiscriminator-system

```
        imperviousDiscriminator-system NAME BINDING
            SUBORDINATE OBJECT CLASS
                "CCITT Rec. X.721 (1992) | ISO/IEC 10165-2 : 1992":discriminator
                AND SUBCLASSES;
            NAMED BY SUPERIOR OBJECT CLASS
                "CCITT Rec. X.721 (1992) | ISO/IEC 10165-2 : 1992":system
                AND SUBCLASSES;
            WITH ATTRIBUTE
                "CCITT Rec. X.721 (1992) | ISO/IEC 10165-2 : 1992":discriminatorId;
            BEHAVIOUR
                imperviousDiscriminator-systemBhv;
        REGISTERED AS { iso(1) identified-organization(3) ibm(18) 0 0 3409 };
```

ATTRIBUTES switchMOCTo

```
        switchMOCTo ATTRIBUTE
            WITH ATTRIBUTE SYNTAX
                ASEFDmodule.SetOfManagedObjectClasses;
            MATCHES FOR
                EQUALITY,
                SET-COMPARISON,
                SET-INTERSECTION;
```

BEHAVIOUR
    switchMOCToBhv;
REGISTERED AS { iso(1) identified-organization(3) ibm(18) 0 0 2775 };

validAllomorphs validAllomorphs ATTRIBUTE
    WITH ATTRIBUTE SYNTAX
        ASEFDmodule.SetOfManagedObjectClasses;
    MATCHES FOR
        EQUALITY,
        SET-COMPARISON,
        SET-INTERSECTION;
    BEHAVIOUR
        validAllomorphsBhv;
    REGISTERED AS { iso(1) identified-organization(3) ibm(18) 0 0 2776 };

ATTRIBUTE GROUPS

BEHAVIOURS allomorphismSensitiveEFDBhv allomorphismSensitiveEFDBhv BEHAVIOUR
    DEFINED AS

" An instance with this behaviour provides a deterministic mechanism for an agent to provide allomorphic event reports to a manager.

Allomorphic event reports differ from non-allomorphic event reports only in the value of the *managedObjectClass* parameter of the event report. An allomorphic event report will contain a valid allomorphic class in the *managedObjectClass* parameter. A non-allomorphic event report will contain the actual class of the managed object in the *managedObjectClass* parameter. The information content of the event report will be exactly that defined in the managed object class definition for the managed object that emitted the notification, i.e. it is not modified as a consequence of allomorphism.

An instance with this behaviour realizes allomorphic event reports by being able to operate on the *validAllomorphs* attribute of a potential event report. The *validAllomorphs* attribute value is mapped from the *set of valid allomorphic classes for which the notification is defined*. The set of valid allomorphic classes for which the notification is defined is made available by a managed object acting allomorphically, in conjunction with the notification at the managed object boundary.

An instance with this behaviour decides whether an allomorphic event report, or alternatively, a non-allomorphic event report is issued.

An instance with this behaviour takes the following processing steps in determining if an allomorphic event report should be emitted:

1. determine if the value of the *managedObjectClass* attribute of the potential event report is a set element of the *switchMOCTo* attribute.

- If TRUE, then an allomorphic event report will not be issued. The *managedObjectClass* parameter of the event report will contain the value of the actual class of the managed object, not an allomorphic class.

- If FALSE, then proceed to the next step 2. compare the value of the _switchMOCTo_ attribute to the value of the _validAllomorphs_ attribute of the potential event report.

(switchMOCTo) NON-NULL INTERSECTION (validAllomorphs)

- If TRUE, then an allomorphic event report will be issued. Proceed onto the next step.

- If FALSE, then an allomorphic event report will not be issued. The _managedObjectClass_ parameter of the event report will contain the value of the actual class of the managed object, not an allomorphic class.

3. The candidate values for insertion into the _managedObject Class_ field of the allomorphic event report are the result of a logical operation: The result of the operation is a set of zero or more elements, where each element corresponds to a candidate allomorphic class for insertion:

(switchMOCTo) LOGICAL INTERSECTION (validAllomorphs)

If multiple elements result from the operation, then it is a local implementation option to choose one of the elements.

An instance of this behaviour supports discriminating on a number of attributes mapped from notification parameters:

| Table 1. Minimum required Potential Event Report Attributes | |
|---|---|
| attribute | Object Identifier |
| managedObjectClass | {smi2AttributeID 60} |
| eventType | {smi2AttributeID 14} |
| managedObjectInstance | {smi2AttributeID 61} |
| perceivedSeverity | {smi2AttributeID 17} |
| securityAlarmSeverity | {smi2AttributeID 23} |
| validAllomorphs | { 1 3 18 0 0 2776 } |

Other attributes derived from notifications must be specified as part of the GDMO NOTIFICATION template constructs of WITH INFORMATION SYNTAX and AND ATTRIBUTE IDs. ";

imperviousDiscriminator-systemBhv
    imperviousDiscriminator-systemBhv BEHAVIOUR
        DEFINED AS

"

An instance with this name binding is impervious to Delete requests by management operations.

The permitted value of the _discriminatorConstruct_ attribute is restricted to the attribute value assigned to the _discriminatorConstruct_ attribute at Create time. The default value of the _discriminatorConstruct_ attribute is

```
         (managedObjectClass) EQUALITY (allomorphismSensitiveEFD)
                              OR
         (eventForwardingDiscrminator SUBSET OF (validAllomorphs)
```

The permitted value of the *administrativeState* attribute is restricted to "unlocked".

The permitted value of the *switchMOCTo* attribute is restricted to the value assigned at Create time.

The value of the *discriminatorId* naming attribute is fixed to 'IMPERVEFD'.";

multipleDestBhv multipleDestBhv BEHAVI
   DEFINED AS

"An instance with this behaviour can have Add member and Remo member operations performed on the *destination* attribute b use the permitted value of the *destination* attribute is multip sdq.;

persistenceBhv persistenceBhv BEHAVIOUR
   DEFINED AS

"At recovery time after a catastrophic failure, the mandatory initial values of attributes are assigned by the local system. The local system derives the initial values from the attribute values of the 'most recent instance' of a managed object (at its delete time) with the same managed object class and distinguished name of the managed object being created. The ability to generate or retrieve attribute values of the 'most recent instance' by the local system is referred to as persistence.

If there is no persistent information available about a particular attribute, or for the 'most recent instance', then a mandatory initial value is not assigned to that attribute.";

singleDestBhv singleDestBhv BEHAVIOUR
   DEFINED AS

"An instance with this behaviour supports forwarding events to a single destination, not multiple destinations, because the permitted value of the destination attribute is single.";

switchMOCToBhv switchMOCToBhv BEHAVIOUR
   DEFINED AS

" The value of an attribute with this behaviour indicates managed object classes that are eligible to be placed into the *managed ObjectClass* parameter of an event report. ";

validAllomorphsBhv validAllomorphsBhv BEHAVIOUR
   DEFINED AS

" The value of an attribute with this behaviour is mapped from the *set of valid allomorphic classes for which the notification is defined*. The set of valid allomorphic classes for which the notification is defined is made available by a managed object acting allomorphically, in conjunction with a notification at the managed object boundary. ";

ACTIONS

NOTIFICATIONS

What is claimed is:

1. In a computing system network having a manager application (manager) and an agent application (agent), wherein the manager manages program objects used by the agent and the manager creates event forwarding discriminators (EFDs) associated with the agent to notify the manager when preselected object events occur at the program object used by the agent, a method for providing for the manager a persistent impervious (PI) EFD at the agent comprising the computer implemented steps of:

instantiating the PI EFD at the agent when the agent starts up, storing attributes of the PI EFD in non-volatile memory as stored attributes;

reinstantiating the PI EFD at the agent, when the agent restarts after going down, and restoring the attributes of the PI EFD from the stored attributes in non-volatile memory; and notifying the manager that a create PI EFD event has occurred, to indicate to the manager that the agent went down and has restarted.

2. The method of claim 1, further including the steps of:

updating the stored attributes of the PI EFD as the agent operates so that the stored attributes represent the last operative state of the agent;

said restoring step restoring the attributes of the reinstantiated PI EFD to the last operative state of the agent.

3. The method of claim 1 wherein the step of notifying the manager that a create PI EFD event has occurred includes the steps of:

generating an object creation notification within the PI EFD;

sending the PI EFD object creation notification from the PI EFD to the agent;

building a PI EFD object creation potential event report within the agent;

determining that the PI EFD object creation potential event report originated from an EFD;

building a PI EFD object creation actual event report within the agent;

sending the PI EFD object creation actual event report to the manager.

4. The method of claim 1 further including the steps of:

sending an EFD object deletion message to the manager from a PI EFD to indicate a manager created EFD has been deleted;

creating from the manager a new EFD at the agent to replace the deleted EFD.

5. The method of claim 4 further including the steps of:

testing whether the creation of the new EFD was successful;

polling managed objects at the agent from the manager if the new EFD creating step was not successful.

6. The method of claim 1 further including the steps of:

setting a first set of the attributes of the PI EFD as changeable by the agent only in response to a request from the manager and a second set of attributes changeable by the agent in response to a request from any manager application;

testing whether the manager concurs with changes to the second set of attributes by another manager application;

resetting the second set of attributes if the manager does not concur with the changes to the second set.

7. The method of claim 6 wherein said second set of attributes includes a destination list indicating managers to receive event reports from the PI EFD.

8. The method of claim 7 wherein said resetting step includes step of:

removing a change to the destination list if the manager does not concur with the change.

9. The method of claim 6, further including the step of:

generating a security breach message if the manager does not concur with the change.

* * * * *